United States Patent
Hoshi et al.

(10) Patent No.: US 7,277,976 B2
(45) Date of Patent: *Oct. 2, 2007

(54) MULTILAYER SYSTEM AND CLOCK CONTROL METHOD

(75) Inventors: Sachiko Hoshi, Kawasaki (JP); Kyoichi Nariai, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 92 days.

This patent is subject to a terminal disclaimer.

(21) Appl. No.: 11/068,753

(22) Filed: Mar. 2, 2005

(65) Prior Publication Data

US 2005/0198418 A1 Sep. 8, 2005

(30) Foreign Application Priority Data

Mar. 2, 2004 (JP) .............................. 2004-057598

(51) Int. Cl.
*G06F 13/00* (2006.01)
*G06F 1/00* (2006.01)

(52) U.S. Cl. ........................ 710/317; 710/110; 713/322

(58) Field of Classification Search ............... 710/15, 710/18, 51, 58–61, 110, 305, 31, 316, 317; 713/300, 320, 322, 323, 324
See application file for complete search history.

(56) References Cited

U.S. PATENT DOCUMENTS

| | | | |
|---|---|---|---|
| 5,345,564 A * | 9/1994 | Jensen et al. ............... | 713/600 |
| 5,600,839 A * | 2/1997 | MacDonald ................. | 713/322 |
| 6,163,848 A * | 12/2000 | Gephardt et al. ........... | 713/322 |
| 7,058,842 B2 * | 6/2006 | Inoue .......................... | 713/600 |
| 2003/0093702 A1 * | 5/2003 | Luo et al. .................... | 713/320 |
| 2003/0200470 A1 * | 10/2003 | Yamada ....................... | 713/300 |
| 2005/0256986 A1 * | 11/2005 | Kim et al. ................... | 710/110 |

FOREIGN PATENT DOCUMENTS

JP 2003-141061 5/2003

OTHER PUBLICATIONS

Machine Translation of JP 2003-141061.*
Korean Patent Abstract of Korean Publication No. 100289396, Feb. 19, 2001.*
Multilayer AHB Overview, ARM Limited, Copyright 2001, 2004.*
Shared, Switched, or Networked? The Uncharted Future of On-Chip Buses, TechOnLine Publication, Sep. 24, 2002.*
Rapid Design, Verification, and Optimization of ARM Technology-Based Embedded Systems, Mentor Graphics Corporation, 2004.*

* cited by examiner

*Primary Examiner*—Khanh Dang
(74) *Attorney, Agent, or Firm*—Young & Thompson

(57) ABSTRACT

The multilayer system of this invention is characterized by the process when a first master such as a CPU to which a clock signal is constantly supplied from a clock generator activates a second master. First, the first master outputs an activation signal for activating the second master to the second master through a slave corresponding to the second master. The second master is activated by the activation signal and outputs to the clock generator a clock request signal for requesting supply of a clock signal to the second master. The clock generator supplies a clock signal to the second master in response to the clock request signal.

23 Claims, 6 Drawing Sheets

MULTILAYER SYSTEM AND CLOCK CONTROL METHOD

BACKGROUND OF THE INVENTION

1. Field of the Invention

The present invention relates to a multilayer system including a multilayer switch which allows simultaneous processing of commands from a plurality of masters and a clock control method in the multilayer system.

2. Description of Related Art

Recent mobile phones have become multifunctional, having not only telephone functions but also internet connection functions, camera functions and so on. Further, in order to realize downsizing, weight saving, and reduction in power consumption, System on Chip (SoC) technology which incorporates multiple functions on one chip has been developed.

Such mobile phones require high speed, simultaneous processing. Thus, a multilayer switch which allows simultaneous access to a plurality of slaves has been proposed.

Use of the multilayer switch permits to carry out a process of writing image data from a camera into a given memory region and a process of reading the image data stored in the memory and displaying it on a screen at the same time.

FIG. 5 shows a configuration example of a system including a multilayer switch. A plurality of master modules (hereinafter simply as "masters") 11 and slave modules ("slaves") 13 are connected to a multilayer switch module ("multilayer switch") 12. The multilayer switch 12 includes a switch master portion 120 connected to each master 11 and a switch slave portion 121 connected to each slave 13.

A clock generator 14 constantly supplies clock signals to the masters 11, the multilayer switch 12, and the slaves 13.

FIG. 6 shows a layout example of circuits on one chip. For example, an M0 which is the master 11 such as a CPU is placed at a corner. Other modules such as SWM0, SWS0, S0, and S1 are arranged on the chip in a dispersed manner. A clock signal is constantly supplied to each module from the clock generator 14.

Each module receives a clock signal and operates, thereby consuming power. A drive buffer 15 is placed in a line between each module and the clock generator 14 in order to prevent deterioration of a signal waveform or control timing. If a line length from each module to the clock generator 14 is long, many drive buffers 15 are placed as shown in FIG. 6. The drive buffer 15 also consumes power due to a through current when the output of a transistor changes from high to low or from low to high.

Japanese Unexamined Patent Application Publication No. 2003-141061 discloses a technique that supplies power to only some of a plurality of buses in a normal bus configuration. However, these buses do not have a multilayer switch function that allows simultaneous processing of commands from a plurality of masters.

As described above, the present invention has recognized that a conventional multilayer system requires a large amount of power since it supplies clock signals to all of the masters, slaves, and multilayer switch.

SUMMARY OF THE INVENTION

According to one aspect of the present invention, there is provided a multilayer system that includes a plurality of masters; a plurality of slaves; a multilayer switch disposed between the masters and the slaves and simultaneously processing commands from the plurality of masters; and a clock generator supplying a clock signal to the masters, the slaves, and the multilayer switch, wherein the plurality of masters comprise a first master to which a clock signal is constantly supplied from the clock generator, and a second master to which a clock signal is supplied as needed, when activating the second master by the first master, the first master outputs an activation signal for activating the second master to the second master through a slave corresponding to the second master, the second master is activated in response to the activation signal and outputs to the clock generator a clock request signal requesting supply of a clock signal to the second master, and the clock generator supplies a clock signal to the second master in response to the clock request signal. Since the second master is activated by the activation signal and outputs to the clock generator a clock request signal that requests supply of a clock to the second master so that the clock generator supplies a clock signal to the second master in response to the clock request signal in this invention, it is possible to reduce a time to supply the clock signal and achieve power saving of the circuit.

According to one aspect of the present invention, there is provided a clock supply method in a multilayer system including a plurality of masters; a plurality of slaves; a multilayer switch disposed between the masters and the slaves and simultaneously processing commands from the plurality of masters; and a clock generator supplying a clock signal, the plurality of masters having a first master to which a clock signal is constantly supplied from the clock generator and a second master to which a clock signal is supplied as needed, the method including, when activating the second master by the first master, outputting from the first master an activation signal for activating the second master to the second master through a slave corresponding to the second master; activating the second master in response to the activation signal and outputting from the second master to the clock generator a clock request signal requesting supply of a clock signal to the second master; and supplying from the clock generator a clock signal to the second master in response to the clock request signal. Since this invention includes activating the second master by the activation signal so that the second master outputs to the clock generator a clock request signal that requests supply of a clock to the second master, and supplying from the clock generator a clock signal to the second master in response to the clock request signal in this invention, it is possible to reduce a time to supply the clock signal and achieve power saving of the circuit.

The present invention provides a multilayer system with low power consumption and a clock control method in the multilayer system.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
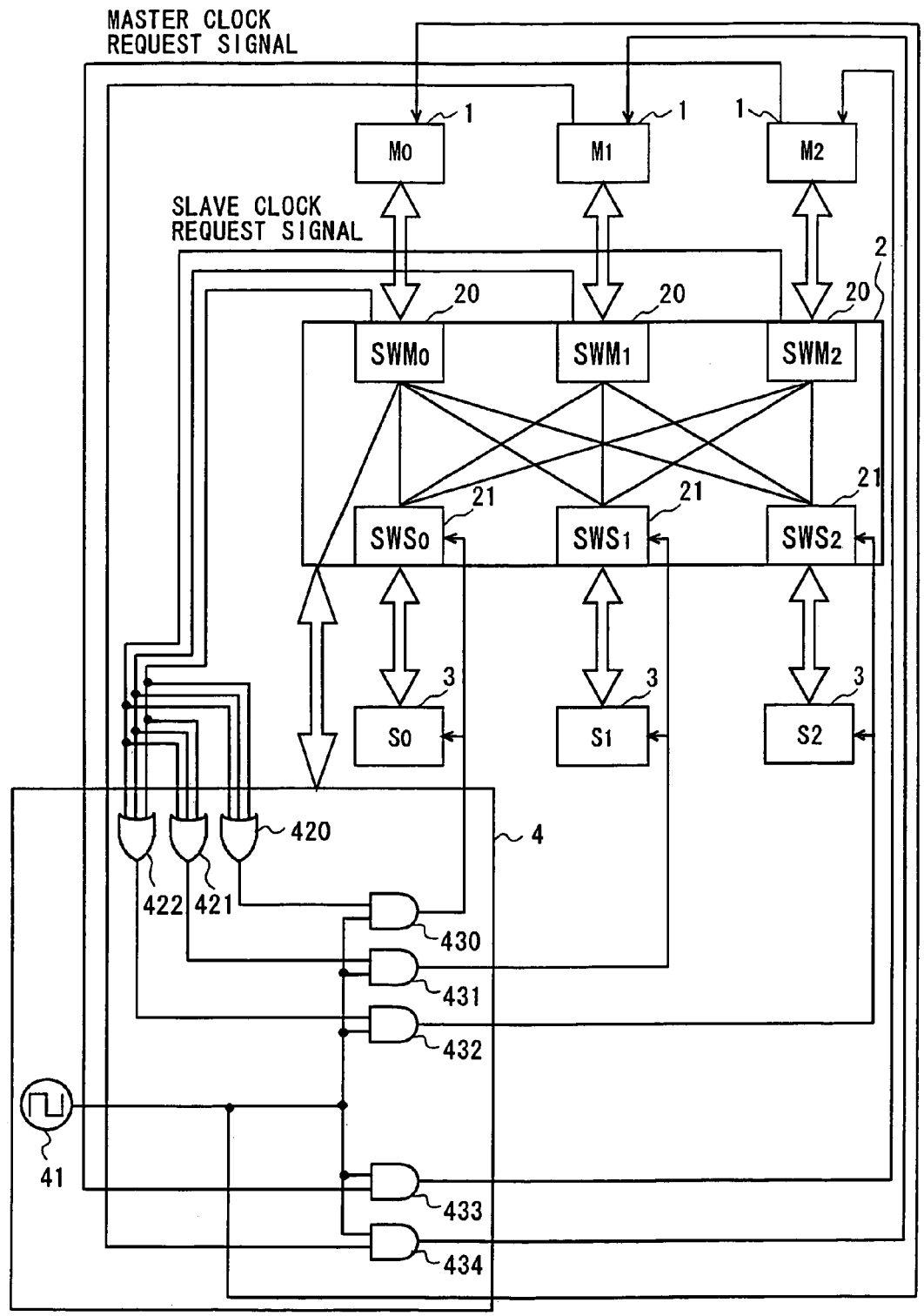
FIG. 1 is a block diagram of a multilayer system of the present invention.

FIG. 1 shows a block diagram of a multilayer system of the present invention. The multilayer system includes a plurality of masters 1 (M0, M1, M2), a plurality of slaves 3 (S0, S1, S2), a multilayer switch 2 for the masters 1 and the slaves 3, and a clock generator 4 supplying a clock signal to each module.

The master 1 is a module that controls the system, such as Central Processor Unit (CPU), Digital Signal Processor (DSP), image rotating device, camera image processing circuit, Liquid Crystal Display (LCD) controller, and so on. In this example, the M0 is a CPU that always operates. The M1 and M2 are modules that operate as needed according to instructions from the M0.

The multilayer switch 2 allows simultaneous processing of commands from a plurality of masters. The multilayer switch 2 is an interconnection bus system that allows use of a parallel access path between a plurality of masters and slaves in the system. The bus system is realized by use of a more complex interconnection matrix and provides advantages such as increase in architecture options and in the entire bus bandwidth. The multilayer switch 2 is offered by ARM Ltd. as Advanced High-performance Bus (AHB), AHB-Lite®, for example.

The slave 3 is a module that is controlled by the master 1. The slave 3 includes a memory, a register, a timer, a serial interface circuit, and so on. In this example, S1 and M1 are a pair, and S2 and M2 are a pair. For example, if the M1 is a main circuit portion of an LCD controller, the S1 is a register portion of the LCD controller. The register portion includes a parameter setting register and an activation control register. The slaves 3 perform clock control independently from each other. Specifically, no clock is supplied to the slave 3 in normal times, and upon occurrence of an access to the slave 3 from the master 1, a clock signal is supplied to the accessed slave 3.

The configuration of the multilayer switch 2 is described in detail below. The multilayer switch 2 has switch master portions 20 (SWM0, SWM1, SWM2) connected to each of the masters 1 (M0, M1, M2), and switch slave portions 21 (SWS0, SWS1, SWS2) connected to each of the slaves 3.

The switch master portion 20 has the function that determines which slave 3 is to be connected in response to the access from the master 1 and sends an access request to the switch slave portion 21 corresponding to the slave 3 to be connected. Further, the switch master portion 20 generates a clock request signal to the clock generator 4 to supply a clock signal to the slave 3 to be accessed and the switch slave portion 21 corresponding to the slave 3 to be accessed.

The key function of the switch slave portion 21 is to arbitrate the access signals from each switch master portion 20, select one access and make a connection to the selected slave 3. The switch slave portions 21 perform clock control independently from each other. Specifically, no clock is supplied to the switch slave portion 21 in normal times, and a clock signal is supplied thereto upon occurrence of an access to the corresponding slave 3 from the master 1.

In FIG. 1, the clock generator 4 generates a clock signal supplied to each module. The clock generator 4 starts or stops supplying the clock signal to a corresponding module according to a clock request signal.

The clock generator 4 includes a clock signal oscillator 41, OR circuits 420, 421, 422, and AND circuits 430, 431, 432, 433, 434. The clock signal oscillator 41 outputs a clock oscillation signal. The clock signal oscillator 41 may be placed outside the chip. The inputs of the OR circuits 420, 421, and 422 are connected to outputs of SWM0, SWM1, and SWM2. A slave clock request signal is thus input to the OR circuits 420, 421, and 422 from the SWM0, SWM1, and SWM2.

One inputs of the AND circuits 430 to 434 are connected to the output of the clock signal oscillator 41. The clock signal oscillator 41 supplies a clock oscillator signal to the AND circuits 430 to 434. The other input of the AND circuit 430 is connected to the output of the OR circuit 420. The other input of the AND circuit 431 is connected to the output of the OR circuit 421. The other input of the AND circuit 432 is connected to the output of the OR circuit 422.

The other input of the AND circuit 433 is connected to the output of the M2. The other input of the AND circuit 434 is connected to the output of the M1.

The output of the AND circuit 430 is connected to SWS0 and S0, the output of the AND circuit 431 is connected to SWS1 and S1, and the output of the AND circuit 432 is connected to SWS2 and S2. The output of the AND circuit 433 is connected to the M2, and the output of the AND circuit 434 is connected to the M1. The clock signal oscillator 41 is connected to the M0.

Since a clock oscillator signal is constantly supplied from the clock signal oscillator 41 to the AND circuits 430 to 432, any of the AND circuits 430 to 432 which has received an ON signal from the OR circuits 420 to 422 outputs a clock signal. The clock signal is input to the switch slave portion 21 and the slave 3 connected thereto. Similarly, the AND circuits 434, 433 which has received an ON signal from the M1, M2 outputs a clock signal. The clock signal is input to the M1 and M2 connected thereto.

In this example, a clock signal is constantly supplied to the M0, which is the master 1.

The operation of the multilayer system according to an embodiment the invention is described hereinafter. The case where M0, which is the master 1, activates M1 so that the M1 starts operating is described hereinafter with reference to the system block diagram of FIG. 1.

The clock signal oscillator 41 constantly supplies a clock signal to the M0, the master 1. However, since the clock generator 4 does not receive a slave clock request signal from the switch master portion 20 and thus the slave clock request signal is off, no clock signal is supplied to the slaves 3 and the switch slave portions 21.

Upon occurrence of an access from the M0 to the S1, the M0 outputs an address signal of an access destination (S1 in this case) and a control signal such as a read/write signal to SWM0, which is the switch master portion 20 of the multilayer switch 2. The control signal in this case includes an activation signal of the M1.

The SWM0 determines which slave 3 is to be accessed based on the address signal from the M0. Further, the SWM0 generates a slave clock request signal that requests to supply a clock signal to the S1, which is the slave 3 to be accessed and the SWS1 corresponding to the S1, and outputs the signal to the clock generator 4. Further, the SWM0 outputs the access destination address signal and control signal to the SWS1.

The clock generator 4 receives the clock request signal output from the SWM0. Since the clock request signal requests to supply a clock signal to the S1 and SWS1 in this example, it is input to the OR circuit 421. The OR circuit 421 outputs an ON signal to the AND circuit 431 in response to input of the clock request signal. The AND circuit 431 outputs the clock signal from the clock signal oscillator 41 to the S and SWS1 in response to input of the ON signal. The clock signal is thereby supplied to the S1 and SWS1 so that the S1 and SWS1 are ready for operation. It is also possible to constantly supply a clock signal to either one of the S1 and SWS1, and perform a clock control on the other one.

The SWS1 outputs the access destination address signal and the control signal from the SWM0 to the S1, which is the slave 3 to be accessed. Receiving the address signal and the control signal and in response to an activation signal of the M1 included in the control signal, the S1 outputs the activation signal to the M1.

Receiving the activation signal from the S1, the M1 outputs to the clock generator 4 a master clock request signal that requests to supply a clock signal to the M1 itself. The clock generator 4 receives the master clock request signal. The clock request signal turns on the other input of the AND circuit 434 so that the AND circuit 434 outputs a clock signal, which is supplied to the M1.

After that, recognizing the completion of a series of operations, the M1 stops outputting the clock request signal in order to stop supply of the clock signal to the M1, and the clock request signal is thereby turned off. In the clock generator 4, in response to the stop of the clock request signal, the input signal to the AND circuit 434 changes from the ON signal to OFF signal, and the AND circuit 434 thereby stops outputting the generation signal from the clock signal oscillator 41. This stops the supply of the clock signal to the M1.

Figure 2:
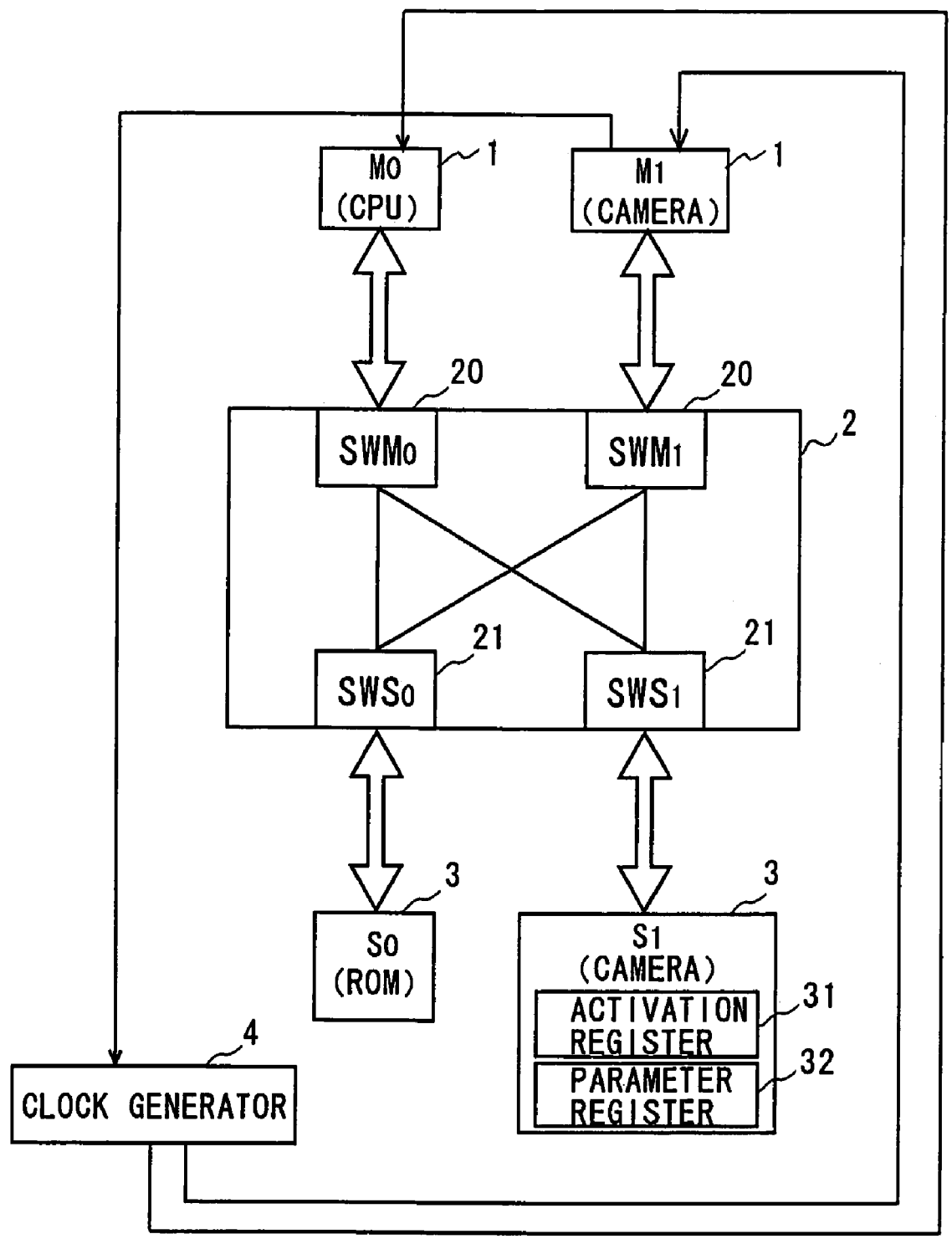
FIG. 2 is a diagram showing a specific configuration example of a multilayer system of the present invention.

Advantages of the multilayer system of this invention are described below with a specific example. In this example, the multilayer system is applied to a mobile phone with a camera function. A series of operations from release of the shutter of the camera to activation of a camera image processing circuit are described hereinafter. FIG. 2 shows a system block diagram of a camera. In this example, M0 is a CPU and M1 is a camera image processing circuit. The camera image processing circuit takes in data from an image sensor, which is not shown, and writes the data to a memory. S0 is ROM, and S1 includes an activation register 31 for activating the camera and a parameter register 32.

Figure 3:
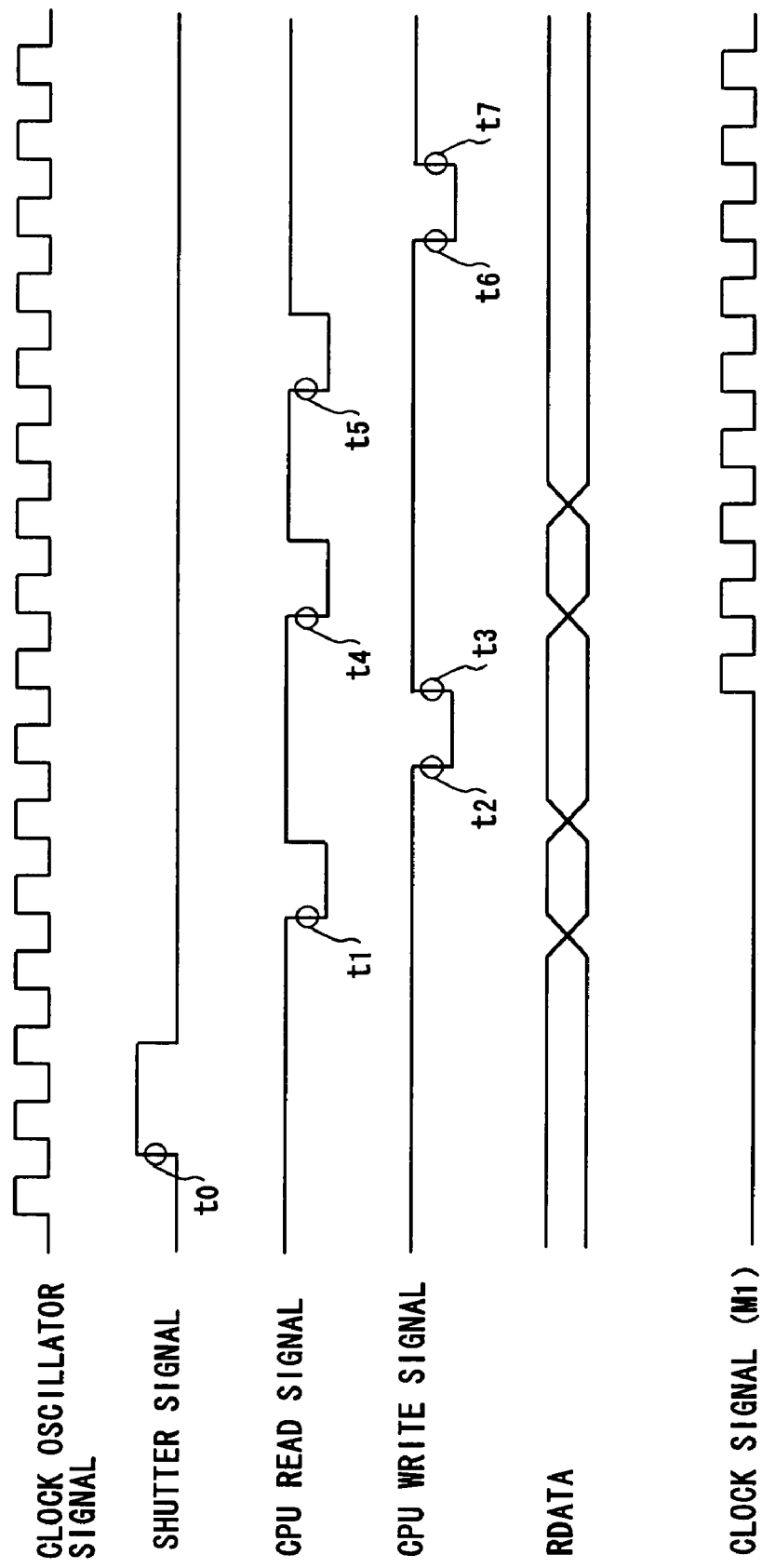
FIG. 3 is a timing chart of a comparative example.

Referring first to the timing chart of FIG. 3, the operation when the CPU reads a command from the ROM and activates the camera image processing circuit is described as a comparative example. In the clock generator 4, the clock signal oscillator 41 constantly outputs a clock oscillator signal. The CPU receives a clock signal from the clock generator 4, thus being ready for operation.

At a time t0, the shutter is released to turn on a shutter signal. Then, at a given time t1, the CPU reads a command from the ROM in synchronization with the clock signal from the clock generator 4. This command instructs writing to a given register (not shown) in the clock generator 4 to request supply of a clock signal to the camera image processing circuit. The CPU reads the command from the ROM, interprets it, and writes data for requesting supply of a clock signal to the camera image processing circuit into a predetermined region of a register in the clock generator at t2 in synchronization with the next clock signal. The clock generator 4 starts supplying a clock signal to the camera image processing circuit at t3 in response to the writing to the register.

Then, at t4, the CPU reads a command from the ROM in synchronization with the clock signal. This command is an activation signal that activates the camera image processing circuit. Another command may be processed at t5 in some cases.

At t6, the CPU writes data into a predetermined region of the activation register 31 based on the activation signal to the camera image processing circuit. In response to the writing operation, the camera image processing circuit is activated at t7.

Referring next to the timing chart of FIG. 4, the operation according to an embodiment of the present invention is described hereinafter. In this case, when the CPU directly writes data to the activation register 31 via the multilayer switch 2, the camera image processing circuit outputs to the clock generator 4 a master clock request signal that requests supply of a clock signal to the camera image processing circuit itself in synchronization with the same clock. In response to the master clock request signal, the clock generator 4 supplies a clock signal to the camera image processing circuit in synchronization with the same clock. The camera image processing circuit is activated in response to data writing to the activation register 31.

As described in the foregoing, this embodiment allows performing the supply of a clock signal to the camera image processing circuit and the activation of the camera image processing circuit at the same timing, thereby reducing a time to supply the clock signal. The reduction of the clock signal supply time leads to power saving of the circuit.

Figure 4:
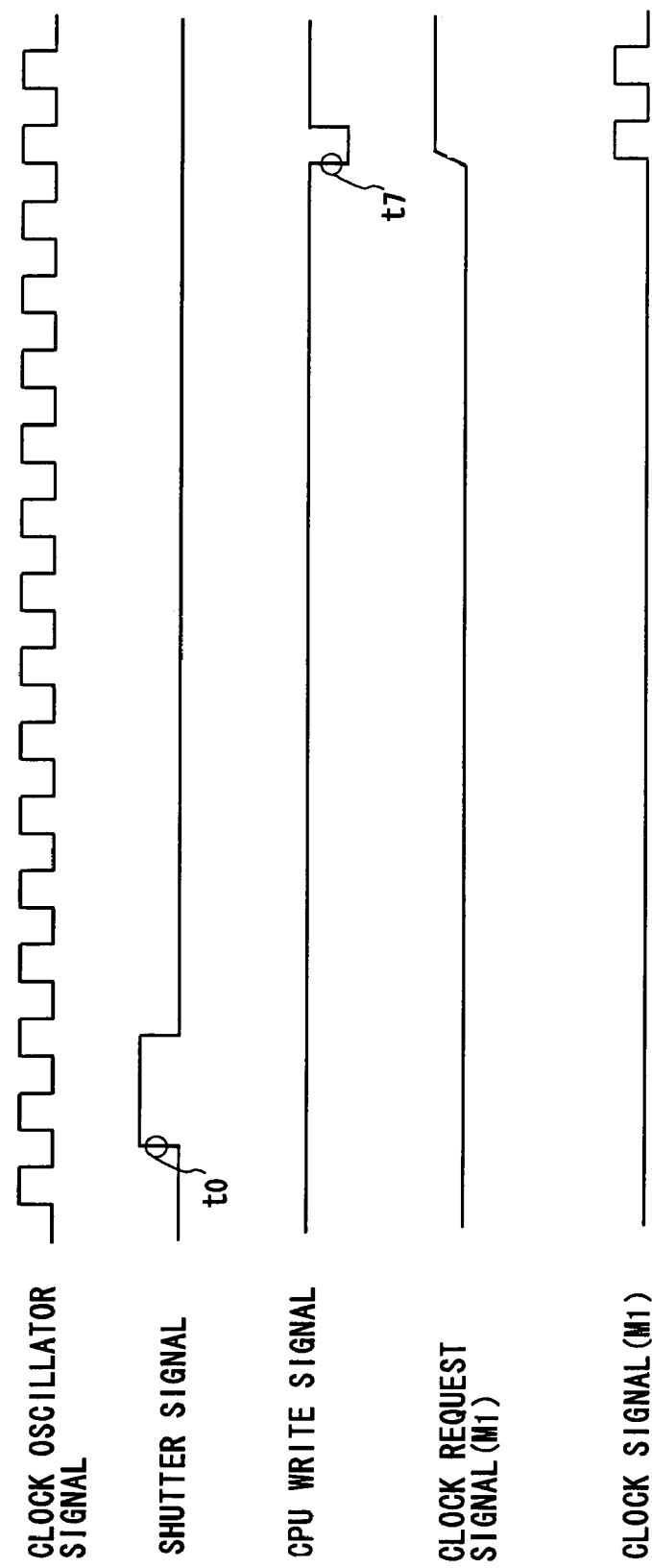
FIG. 4 is a timing chart of an embodiment of the invention.
Figure 5:
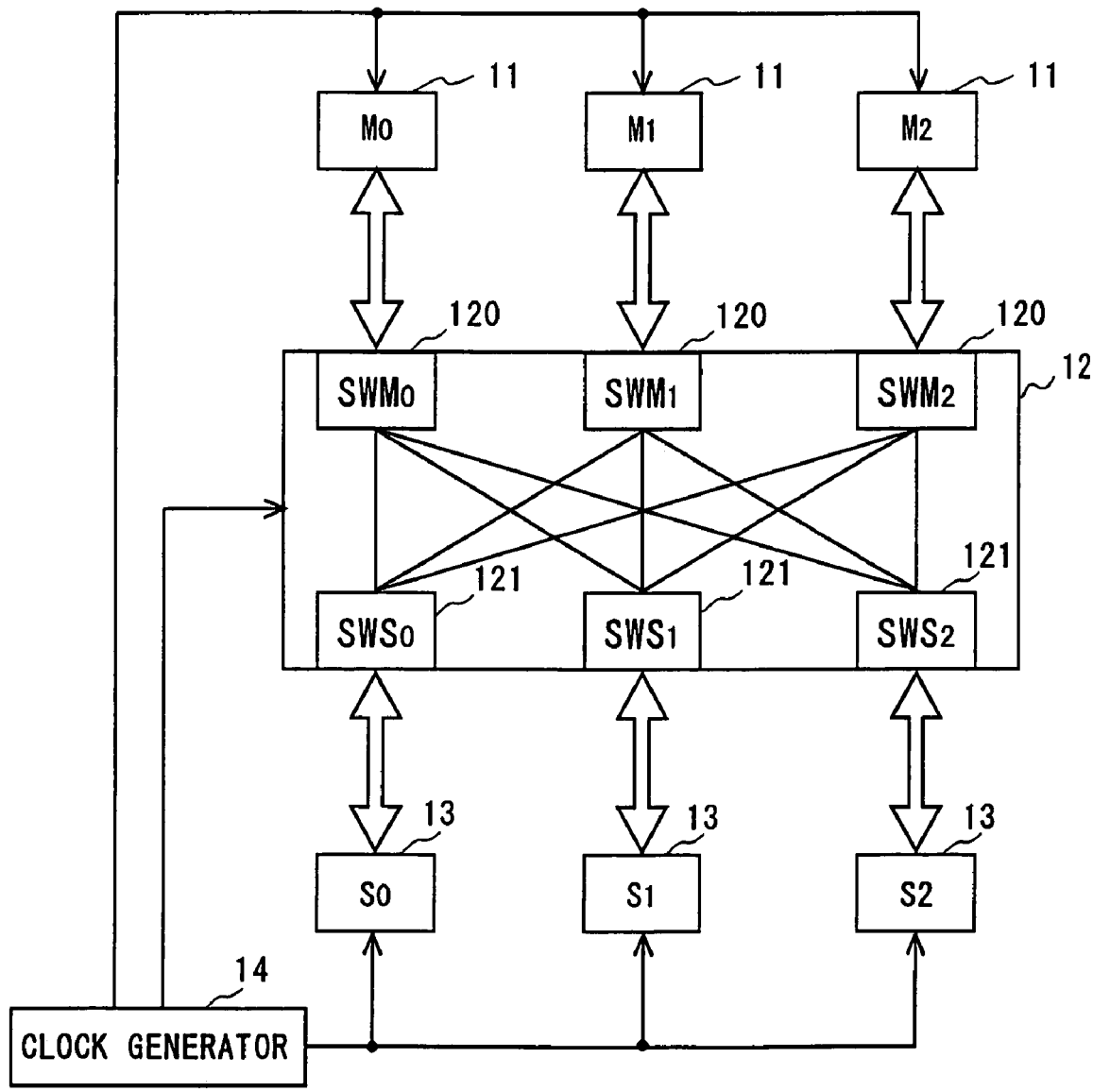
FIG. 5 is a block diagram of a conventional multilayer system.
Figure 6:
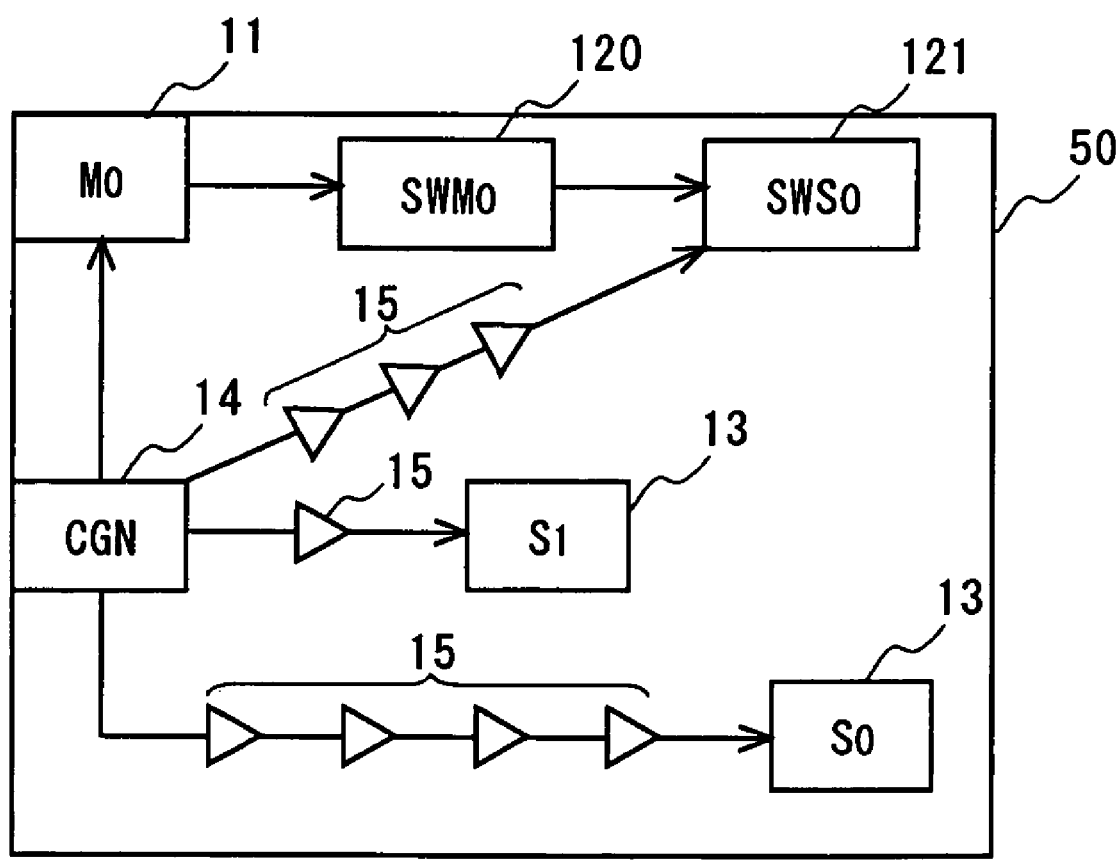
FIG. 6 is a diagram to explain a problem to be solved in a conventional technique.

Specifically, while the comparative example shown in FIG. 3 supplies the clock signal to the camera image processing circuit from t3, the embodiment of the invention shown in FIG. 4 supplies the clock signal from t7, thereby activating the camera image processing circuit at the same timing. This embodiment thereby allows reducing the time to supply the clock signal by the time period from t3 to t7.

Though the above embodiment explains the case where the multilayer system is applied to a mobile phone, it is not limited thereto, and the present invention may be applied to various types of equipments.

It is apparent that the present invention is not limited to the above embodiment that may be modified and changed without departing from the scope and spirit of the invention.

What is claimed is:

1. A multilayer system comprising:
    a plurality of masters;
    a multilayer switch comprising switch master portions and switch slave portions, the switch master portions being connected to the plurality of masters, the multilayer switch being constructed and arranged so as to process commands from the plurality of masters;
    a plurality of slaves connected to the switch slave portions; and
    a clock generator producing a plurality of clock signals separately supplied to the masters, the slaves, and the multilayer switch, the plurality of clock signals comprising a constant clock supplied to a first of said masters, and a start/stop clock supplied to a second of said masters as needed;
    wherein the first master is constructed and arranged to generate an activation signal for activating the second master, the activation signal being sent to the second master through a selected one of the slaves, the second master being constructed and arranged such that the second master is activated in response to receiving the activation signal from the selected slave and the second master outputs to the clock generator a clock request signal requesting supply of the start/stop clock signal to the second master, and the clock generator being constructed and arranged so as to supply the start/stop clock signal to the second master in response to the clock request signal.

2. The multilayer system of claim 1, wherein the second master is constructed and arranged to turn off the clock request signal to the clock generator upon completion of an operation by the second master, and the clock generator is constructed and arranged to recognize an off-state of the clock request signal and to stop supplying the start/stop clock signal to the second master based on the off-state of the clock request signal.

3. The multilayer system of claim 1, wherein, upon occurrence of an access from the second master to the selected slave, the clock generator starts supplying a clock signal to the selected slave.

4. The multilayer system of claim 1, wherein upon occurrence of an access from the second master to the selected slave, the clock generator starts supplying the clock signal to the switch slave portion corresponding to the selected slave.

5. The multilayer system of claim 1, wherein the first master is a central processing unit.

6. The multilayer system of claim 1, wherein the multilayer system is incorporated into a mobile phone.

7. The multilayer system of claim 1, further comprising a third said master, the clock generator providing separate said start/stop clocks to the second master and the third master, the clock generator being constructed and arranged so that the start/stop clock provided to the second master and the start/stop clock provided to the third master can be individually enabled and disabled.

8. A multilayer system comprising:
a plurality of masters;
a multilayer switch comprising switch master portions and switch slave portions, the switch master portions being connected to the plurality of masters, the multilayer switch being constructed and arranged so as to process commands from the plurality of masters;
a plurality of slaves connected to the switch slave portions; and
a clock generator producing a plurality of clock signals separately supplied to the masters, the slaves, and the multilayer switch, the plurality of clock signals comprising a constant clock supplied to a first of said masters, and a start/stop clock supplied to a second of said masters as needed;
wherein the first master is constructed and arranged to generate an activation signal for activating the second master, the activation signal being sent to the second master through a said slave corresponding to the second master, the second master being constructed and arranged such that the second master is activated in response to receiving the activation signal, and the second master outputs to the clock generator a clock request signal requesting supply of the start/stop clock signal to the second master, and the clock generator being constructed and arranged so as to supply the start/stop clock signal to the second master in response to the clock request signal;
wherein the slave corresponding to the second master comprises an activation register, the first master being constructed and arranged to write to the activation register, and the slave being constructed and arranged to output to the second master the activation signal activating the second master in response to writing to the activation register.

9. A clock supply method in a multilayer system comprising steps of:
providing:
a multilayer switch comprising switch master portions and switch slave portions, the switch master portions being connected to the plurality of masters, the multilayer switch being constructed and arranged so as to process commands from the plurality of masters;
a plurality of slaves connected to the switch slave portions; and
a clock generator producing a plurality of clock signals separately supplied to the masters, the slaves, and the multilayer switch, the plurality of clock signals comprising a constant clock supplied to a first of said masters, and a start/stop clock supplied to a second of said masters as needed;
when the first master is to activate the second master to access a selected said slave, outputting from the first master to the second master an activation signal activating the second master, the activation signal being provided through the selected slave;
activating the second master in response to the activation signal received from the selected slave and outputting from the second master to the clock generator a clock request signal requesting supply of the start/stop clock signal to the second master;
and supplying from the clock generator the start/stop clock signal to the second master in response to the clock request signal.

10. The clock supply method of claim 9, comprising the further step of the second master turning off the clock request signal to the clock generator upon completion of operation by the second master, and the clock generator recognizing an off-state of the clock request signal and stopping supply of the start/stop clock signal to the second master based on the off-state of the clock request signal.

11. The clock supply method of claim 9, comprising the further step of, upon occurrence of an access from the second master to the selected slave, the clock generator starts supplying the start/stop clock signal to the selected slave.

12. The clock supply method of claim 9, comprising the further step of, upon occurrence of an access from the master to the slave, the clock generator starting to supply the start/stop clock signal to the switch slave portion corresponding to the selected slave.

13. The clock supply method of claim 9, wherein the first master is a central processing unit.

14. The clock supply method of claim 9, wherein the multilayer system is incorporated into a mobile phone.

15. A clock supply method in a multilayer system comprising steps of:
providing:
a multilayer switch comprising switch master portions and switch slave portions, the switch master portions being connected to the plurality of masters, the multilayer switch being constructed and arranged so as to process commands from the plurality of masters;
a plurality of slaves connected to the switch slave portions; and a clock generator producing a plurality of clock signals separately supplied to the masters, the slaves, and the multilayer switch, the plurality of clock signals comprising a constant clock supplied to a first of said masters, and a start/stop clock supplied to a second of said masters as needed;

when the first master is to activate the second master, outputting from the first master to the second master an activation signal activating the second master, the activation signal being provided through a said slave corresponding to the second master;

activating the second master in response to the activation signal and outputting from the second master to the clock generator a clock request signal requesting supply of the start/stop clock signal to the second master;

and supplying from the clock generator the start/stop clock signal to the second master in response to the clock request signal;

wherein the slave corresponding to the second master comprises an activation register, the activating step comprising writing by the first master to the activation register, and the slave outputting to the second master the activation signal activating the second master in response to writing to the activation register.

16. A multilayer system comprising:
a first master;
at least one second master;
a multilayer switch comprising a plurality of switch master portions connected to respective said first and second masters, the multilayer switch further comprising a plurality of switch slave portions, the multilayer switch being constructed and arranged so as to process commands from the first and second masters;
a plurality of slaves connected to respective said switch slave portions; and
a clock generator receiving as inputs a plurality of clock request signals corresponding to respective said second masters and said slaves, the clock generator generating as an output a constant clock received as an input by the first master, the clock generator further producing as outputs a plurality of separate start/stop clocks that can be separately enabled and disabled, the start/stop clocks corresponding to and received as inputs by respective said second masters and said slaves;
wherein the first master is constructed and arranged to generate an activation signal that initiates an operation between a selected one of the second masters and a selected one of the slaves, the activation signal being sent to the selected second master through the selected slave, the second masters being constructed and arranged so that upon receiving the activation signal from the selected slave, the selected second master outputs to the clock generator a said clock request signal corresponding to the selected second master, the clock generator being constructed and arranged so that upon receiving the clock request signal, the clock generator enables the start/stop clock corresponding to the selected second master.

17. The multilayer system of claim 16, wherein each of the slaves comprises an activation register to which to which the first master can write, each of the slaves being constructed and arranged so that, upon the selected slave having its activation register written, the selected slave forwards the activation signal to the selected second master.

18. The multilayer system of claim 17, wherein the switch master portions of the multilayer switch generate the clock request signals corresponding to the selected slave, the clock generator being constructed and arranged so that upon receiving the clock request signal corresponding to the selected slave, the clock generator enables the start/stop clock corresponding to the selected slave.

19. The multilayer system of claim 18, wherein each of the second masters is constructed and arranged so that upon completion of the operation, the selected second master turns off the clock request signal to the clock generator, causing the clock generator to disable the start/stop clock corresponding to the selected second master.

20. The multilayer system of claim 16, comprising at least two of the second masters, wherein the clock generator provides a separate start/stop clock to each of the second masters, the clock generator being constructed and arranged so that each of the start/stop clocks to the second masters can be individually enabled and disabled.

21. A multilayer system comprising:
a plurality of masters having a first master and a second master;
a multilayer switch having switch master portions connected to the plurality of masters, the multilayer switch further comprising switch slave portions;
a plurality of slaves connected to respective said switch slave portions; and
a clock generator supplying a clock signal to said masters, said slaves, and said multilayer switch, the clock generator being structured and arranged to that said clock signal is constantly supplied to said first master and supplied to said second master as needed;
wherein when activating said second master by said first master, said first master is structured and arranged to output an activation signal to said second master through said multilayer switch and a said slave corresponding to said second master.

22. The multilayer system according to claim 21, wherein said second master is activated in response to said activation signal and outputs to said clock generator a clock request signal requesting supply of a clock signal to said second master.

23. The multilayer system according to claim 22, wherein said clock generator supplies a clock signal to said second master in response to said clock request signal.

* * * * *